2,848,385
GLOSS STABLE PARAFFIN WAX COMPOSITIONS

Karekin G. Arabian and Norman E. Duncan, Houston, Tex., assignors to Shell Development Company, New York, N. Y., a corporation of Delaware No Drawing. Application October 10, 1955
Serial No. 539,675

6 Claims. (Cl. 196—149)

This invention relates to novel wax compositions having improved properties. More particularly, it is directed to crystalline paraffin wax compositions modified to improve the gloss stability of the waxes.

Waxes derived from petroleum crude oils may be sharply divided into two principal classes. These comprise the highly crystalline paraffin waxes and the amorphous, plastic (microcrystalline) waxes. For the most part, the crystalline paraffin waxes are those obtained by the dewaxing of lubricating oil distillates. They predominate in substantially straight-chain paraffin hydrocarbon molecules and contain only minor proportions of iso-paraffins and even smaller amounts of olefins and cyclic structures. They are characterized by their sharp melting point, their high degree of crystallinity and their ability to resist the effects of light and heat insofar as degradation in color is concerned. Microcrystalline waxes, on the other hand, are identified by their plastic and often sticky condition, their characteristic yellow color and their strong tendency to discolor in the presence of light and/or heat. When the latter are mixed with soft wax fractions and lubricating oil, the composition is called "petrolatum."

An important difference between these two classes of petroleum waxes comprises the initially high gloss which may be obtained with the crystalline paraffin waxes, due to their highly crystalline character, and the lack of gloss so characteristic of the microcrystalline waxes, due to their fine-grained or amorphous structure. While it has been noted that crystalline paraffin waxes can be coated on wax paper and the like to give an initially glossy sheet, it has nonetheless been ascertained that this gloss gradually degrades, especially at room temperature, or above, with increasing rapidity as the transition point of the waxes is approached.

Due to the highly stable character of the crystalline paraffin waxes relative to color degradation, this property does not constitute a problem with which any manufacturers of paper coated with crystalline paraffin wax are concerned. Contrary to this experience, it is a major concern of customers utilizing microcrystalline waxes in high grade formulations to obtain and maintain as light a color as possible. Since the microcrystalline waxes are not glossy in nature but are noted especially for their highly flexible and plastic characteristics, the gloss either initially or upon aging is of no concern to these users.

The retention of gloss by paraffin wax surfaces is of major importance especially from the standpoint of saleability, especially the customer response to a selection of waxed papers. Therefore, it is highly desirable to treat or modify crystalline paraffin waxes so that the initial high gloss can be retained over a reasonably long storage period, taking into account the potential time of storage and the expected temperature range at which such waxes will be kept.

It is an object of the present invention to improve the gloss characteristics of crystalline paraffin waxes. It is another object of the present invention to improve the gloss stability of paraffin waxes. It is a further object of this invention to improve the appearance of papers waxed with wax compositions predominating in paraffin waxes. Other objects will become apparent during the following disclosure.

Now, in accordance with the present invention, it has been found that color-stable, but gloss-unstable, highly crystalline paraffin petroleum waxes may be improved with respect to retention of gloss by the incorporation therein of a gloss stabilizing proportion of high molecular weight petroleum hydrocarbon aromatic extracts. More particularly, the present invention comprises wax products predominating in crystalline paraffin waxes as referred to hereinbefore and as described more particularly hereinafter, and minor amounts in the order of about 0.2–5.0% of aromatic hydrocarbon extracts obtained by extraction or adsorption, having minimum average molecular weights of about 450 and minimum average viscosities of about 350 SSU at 210° F., the amount of aromatic extract being sufficient to substantially improve the gloss stability of the crystalline paraffin waxes.

The aromatic extracts useful for improving the gloss stability of crystalline paraffin waxes must have a high enough average molecular weight that they do not tend to degrade other critical properties of the waxes. Most sensitive in this respect is the tendency of paraffin waxes to lose tensile strength upon modification with non-waxy oils. Thus, where the molecular weight of additives present in the paraffin waxes is such as to provide the latter with poor tensile strength, the adverse effect outweighs any benefit which might have been gained relative to an increase in gloss stability by the use of the same additive. Consequently, the aromatic extracts useful for the modification of crystalline paraffin waxes should have viscosities of at least 350 SSU at 210° F. and preferably also should have average molecular weights greater than about 400. More particularly, the most desirable aromatic extracts should have viscosities between about 400 and about 900 SSU at 210° F. and preferably have molecular weights in the order of 500–1000. If the aromatic extracts utilized are of molecular weights or viscosities substantially below these minimum limits, tensile strengths of their blends with crystalline paraffin waxes are degraded to a harmful extent.

The cyclic extracts useful in the subject wax compositions are products predominantly aromatic and naphthenic in nature, obtainable by extracting residual petroleum oils or related oils including the hydrogenation products of coal and the like, with solvents which are selective for non-paraffinic constituents or by adsorption by known procedures on solids such as clay and the like. A wide variety of polar solvents may be used for the preparation of such extracts, liquid sulfur dioxide, phenol, cresylic acid, furfural, nitrobenzene, chlorex, the sulfolanes and sulfolenes being typical examples of suitable solvents. U. S. Patents 2,023,375, 2,357,344, 2,360,859, and 2,365,898, describe solvents which may be advantageously used. Combinations of solvents, such as phenol with cresylic acid or liquid sulfur dioxide with benzene or toluene, for instance, are useful and the use of the so-called double solvent process employing mutually immiscible solvents such as cresylic acid with propane also gives suitable extracts. Methods of this type which may be used are described, for example, in U. S. Patents 2,029,190, 2,124,602, and 2,322,083. There are also advantages in re-extracting the initial extract with an immiscible solvent to improve the selectivity of the extraction. Thus, extractions of Edeleanu extracts of lubricating residual oils with gasoline or the like have been found to provide products of higher aromatic and naphthenic content.

Heavier petroleum oils suitable for use in the present extraction are normally termed "short residues" which are preferably deasphalted prior to extraction with the aromatics extractant. Alternatively, the short residues may be both deasphalted and dewaxed prior to aromatics extraction but the dewaxing step is not essential for obtaining a suitable aromatics extract for use in the compositions described herewith.

The major components of the present crystalline paraffin waxes comprise normal and isoparaffin hydrocarbon waxes usualy derived from petroleum crude oils and having melting points within the range from about 100 to about 190° F. Preferably these are between about 100 and 165° F. and still more preferably between about 110 and about 150° F. The crystalline paraffin waxes preferably predominate in normal paraffin hydrocarbons and may comprise a single wax but ordinarily will be a mixture of relatively closely related paraffin wax molecules. These are usually obtained by well-known dewaxing procedures from waxy lubricating oils, normally distillate oils. In such procedures the general practice is to distill a broad lubricating oil range into a number of relatively narrow fractions, extract the aromatics and color bodies by clay percolation or by solvents such as phenol or the like, and to dissolve the waxy lubricating oil in a solvent such as a methyl ethyl ketone, methyl isobutyl ketone, acetone, or mixtures thereof, with other materials such as benzene and the like, and cooling the wax and oil solution to a predetermined level in order to cause crystallization of the wax components. The latter are removed by centrifuging or filtering and then may be purified by recrystallization or other well-known procedures. Normally they should contain less than about 1% by weight of contaminating oils, namely, those oils which occur naturally in the lubricating oil fractions from which the waxes were separated or oils having viscosities less than about 200 SSU at 210° F.

Higher melting paraffin waxes may be obtained either by close fractionation of high melting distillate paraffin waxes or by fractional recrystallization of waxes obtained from residual lubricating oil stocks. Thus, in the dewaxing of certain residual oils from selected crude sources, a crude wax is obtained which is made up of substantial portions each of microcrystalline wax components and so-called high melting paraffin wax components. These can be separated by fractional crystallization to yield a high grade and highly plastic microcrystalline wax and at the same time a high melting paraffin wax having melting points in the order of 150–195° F. These high melting point paraffin waxes are especially suitable for the modification of distillate paraffin waxes but are regarded as being paraffins of the same general character and of higher molecular weight than those present in the distillate lubricating oil cuts.

In order to improve the gloss stability of crystalline paraffin waxes by the use of the subject high molecular weight aromatic extracts, it is necessary to employ between about 0.2% and about 5.0% based on the total wax product. Preferably between about 0.5% and about 3% of the aromatic extract is employed. As stated hereinbefore, if lower molecular weight aromatic extracts are utilized, the waxes are degraded with respect to other properties. This appears to be true even if the aromatic extract is removed from a residual oil and, more particularly, is noted when aromatic extracts of distillate lubricating oils are utilized.

It is preferred to use as light colored an aromatic extract as possible, although for many products the presence or absence of color is of relatively minor importance. However, a strong sulfuric acid treatment of the aromatic extract will produce products having improved color for incorporation with refined crystalline paraffin waxes to produce products having optimum color characteristics.

The presence of the high molecular weight aromatic extracts in the crystalline paraffin waxes has no beneficial effect upon the color stability of the waxes. This is sharply distinguished from their effect when incorporated in microcrystalline waxes, which have much poorer stability toward color formation. The use of aromatic extracts substantially improves the color stability of microcrystalline waxes. However, there is no noticeable improvement in the gloss or gloss stability of these waxes caused by such incorporation either of aromatic extracts derived from petroleum distillates nor from higher molecular weight petroleum residual oils.

The examples which follow illustrate the principles of the present invention.

Example I

A crystalline paraffin wax, obtained by the dewaxing of an East Texas crude oil distillate and refined by percolation through clay, and having a melting point of 138–140° F. was used in this comparative test. Coated on cardboard and measured for its gloss (percent reflectance) by the method described hereinafter, the wax had a gloss of about 83%. After storage at 73° F. for 9 weeks, the sample had a gloss measurement of about 19%. This same wax was modified by melting and dispersing therein 2% by weight of the final product of an aromatic extract, the product then being used to coat cardboard. This showed substantially the same initial gloss and at the end of 9 weeks the gloss was substantially that of the original sample.

The aromatic extract utilized for this purpose was obtained by the phenol extraction of a short residue obtained during the distillation of an East Texas petroleum crude oil. The extract had the following properties: API gravity at 60° F.=11.8, viscosity at 210° F.=550 SSU, mol. wt.=700, flash=>500° F., pour point=+50° F.

Example II

When paper is coated with a crystalline paraffin wax having a melting point of 122–123° F., the gloss changes from an initial value of about 70 to a value of about 30 after 9 weeks' storage. The addition of an aromatic extract in an amount of about 0.5% by weight of the total product results in a wax product exhibiting substantially no change in gloss reflectance during a same period of storage at 73° F. The aromatic extract utilized for this purpose is obtained by the extraction of a short residue resulting from a distillation of a West Coast crude, said extract having a viscosity at 210° F. of 400–450 SSU. The extractant employed for its isolation is liquid sulfur dioxide.

The gloss determinations are made with a Gardner portable 60 degree glossmeter against gloss standards having 95% reflectance. The specimens of wax coated paper are stored at a temperature of 73° F. and 50% relative humidity. An average of five determinations on a given test specimen 2 inches wide and 3 feet long is reported as the gloss of the specimen at any time during its storage life.

We claim as our invention:

1. A pertoleum wax product comprising a refined normally light-stable gloss-unstable crystalline paraffin petroleum wax and an extract derived from the extraction of a residual petroleum lubricating oil with a selective aromatics extractant, said extract having a viscosity of 400–900 SSU at 210° F. and being present in said product in an amount sufficient to impart thereto substantially improved gloss stability.

2. A petroleum wax product comprising a refined normally light-stable gloss-unstable crystalline paraffin petroleum wax having a melting point between about 100° F. and about 195° F. and an extract derived from the extraction of a residual petroleum lubricating oil with a selective aromatics extractant, said extract having a viscosity of at least about 350 SSU at 210° F., an average molecular weight between 500 and 1000, and being present in said product in an amount sufficient to impart thereto substantially improved gloss stability.

3. A petroleum wax product comprising a refined normally light-stable gloss-unstable crystalline paraffin petroleum wax having a melting point between about 100° F. and about 195° F. and an extract derived from the extraction of a deasphalted petroleum distillation residual oil with an aromatics extractant, said extract having a viscosity of at least about 350 SSU at 210° F. and being present in said product in an amount sufficient to impart thereto substantially improved gloss stability.

4. A petroleum wax product comprising a refined normally light-stable gloss-unstable crystalline paraffin petroleum wax having a melting point between about 100° F. and about 195° F. and an extract derived from the extraction of a deasphalted and dewaxed petroleum distillation residual oil with an aromatics extractant, said extract having a viscosity of at least about 350 SSU at 210° F. and being present in an amount between about 0.2% and about 5.0% by weight of the product.

5. A petroleum wax product comprising a refined normally light-stable gloss-unstable crystalline paraffin petroleum wax having a melting point between about 100° F. and about 150° F. and 0.2–5.0% of an aromatic extract of a deasphalted petroleum residual oil, said extract having a viscosity greater than about 350 SSU at 210° F., an average molecular weight between 500 and 1000, being soluble in phenol in the presence of paraffin hydrocarbons and being present in an amount sufficient to substantially improve the gloss stability of the paraffin wax.

6. A petroleum wax product comprising a refined normally light-stable gloss-unstable crystalline paraffin wax predominating in straight chain paraffin wax molecules and having a melting point between about 110° F. and about 150° F. and 0.5–3% by weight of an aromatic phenol extract of a deasphalted petroleum residual oil, said extract having a viscosity of 400–900 SSU at 210° F. and being present in an amount sufficient to improve the gloss stability of the paraffin wax.

References Cited in the file of this patent

UNITED STATES PATENTS

| | | |
|---|---|---|
| 2,015,739 | Winning | Oct. 1, 1935 |
| 2,374,127 | Peterson et al. | Apr. 17, 1945 |
| 2,444,269 | Phillips | June 29, 1948 |